Horace M. Norman

Dec. 10, 1957  H. M. NORMAN  2,816,258
DYNAMICALLY BRAKED POLYPHASE INDUCTION MOTOR
Filed Jan. 10, 1955  5 Sheets-Sheet 2

Horace M. Norman

Dec. 10, 1957  H. M. NORMAN  2,816,258
DYNAMICALLY BRAKED POLYPHASE INDUCTION MOTOR
Filed Jan. 10, 1955                5 Sheets-Sheet 4

CONNECTIONS FOR MOTORING
T11  To  L1
T16  To  L2
T14  To  L3

Inventor
Horace M. Norman

Dec. 10, 1957  H. M. NORMAN  2,816,258
DYNAMICALLY BRAKED POLYPHASE INDUCTION MOTOR
Filed Jan. 10, 1955  5 Sheets-Sheet 5

CONNECTIONS FOR BRAKING
T 23 To L1
T 19 To L2
T 22 To L3

Horace M. Norman

United States Patent Office 2,816,258
Patented Dec. 10, 1957

2,816,258

DYNAMICALLY BRAKED POLYPHASE INDUCTION MOTOR

Horace M. Norman, West Allis, Wis., assignor to The Louis Allis Company, Milwaukee, Wis., a corporation of Wisconsin Application January 10, 1955, Serial No. 480,897

2 Claims. (Cl. 318—210)

This invention relates to dynamic braking of polyphase induction motors of the type which are provided with squirrel cage rotors.

The invention has as its principal object the provision of such a motor having a primary which may be energized for polyphase motoring in the usual manner or may be energized with alternating current in another manner to effect positive deceleration of the motor with a braking torque of substantial magnitude at high rotor speeds and which torque varies substantially directly with rotor speed at low rotor speeds.

More specifically, it is an object of this invention to provide a polyphase induction motor wherein the coils comprising the stator winding may be connected in two different arrangements, in one of which the coils are grouped to provide a brake winding which, when energized by an alternating current, cooperates with the rotor to decelerate the same to any desired speed, including zero.

Another object of this invention resides in the provision of a polyphase motor having a reconnectable primary which, when connected as a brake winding and energized by an alternating current, produces the effect of a pair of fields that rotate in opposite directions and are substantially equal in magnitude, and which motor has a squirrel cage rotor constructed to afford low effective resistance at motoring speeds and high effective resistance during braking so as to provide satisfactory performance when the primary is energized as a motor winding but to act in conjunction with said oppositely rotating fields produced by the brake winding to positively decelerate the rotor.

In one embodiment of the invention the brake winding is energizable by a source of single-phase alternating current, and its coils are so connected as to provide a number of brake poles in excess of the number of motor poles. Another embodiment of the invention provides for energization of the brake winding with polyphase current, the same as that employed for energizing the motor winding, to likewise produce the effect of a pair of oppositely rotating fields of substantially equal strength and which cooperate in the same manner with the rotor to brake the same.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate several complete examples of the physical embodiments of the invention constructed according to the best modes so far devised for the practical application of the principles thereof, and in which:

Figure 1b is a circuit diagram similar to Figures 1 and 1a, but illustrating a specific form of the switch instrumentality shown schematically in Figures 1 and 1a;

Figure 4:
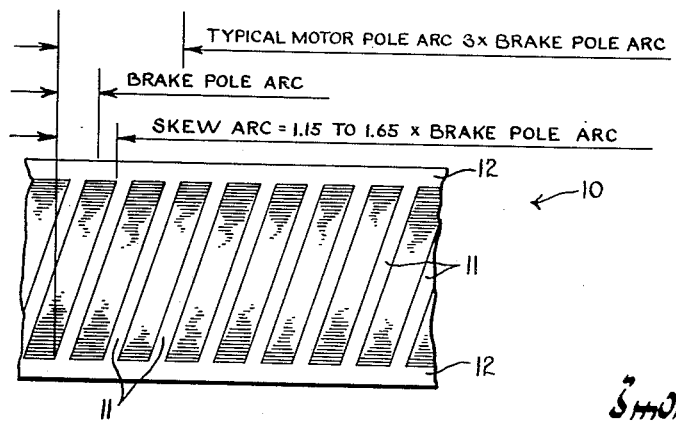
Figure 5:
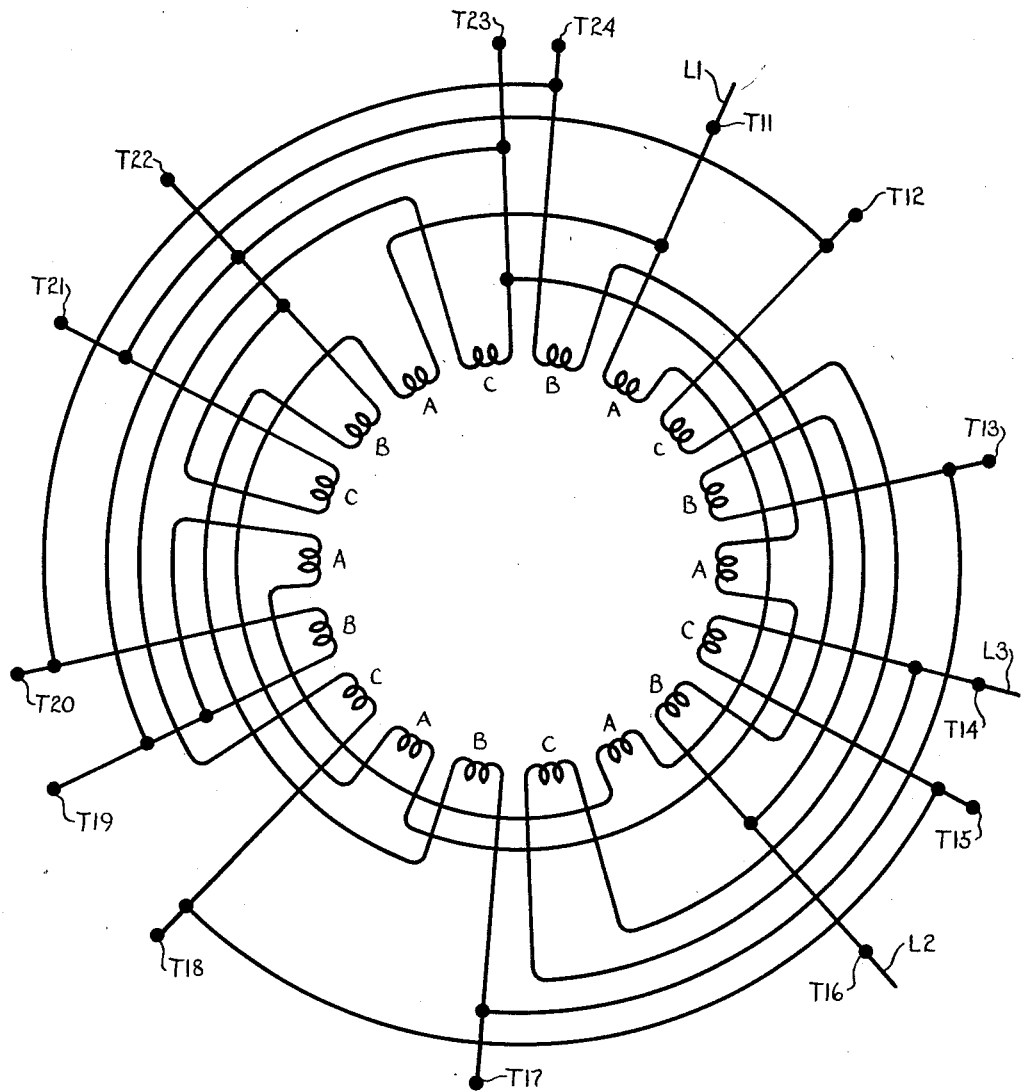
Figure 5A:
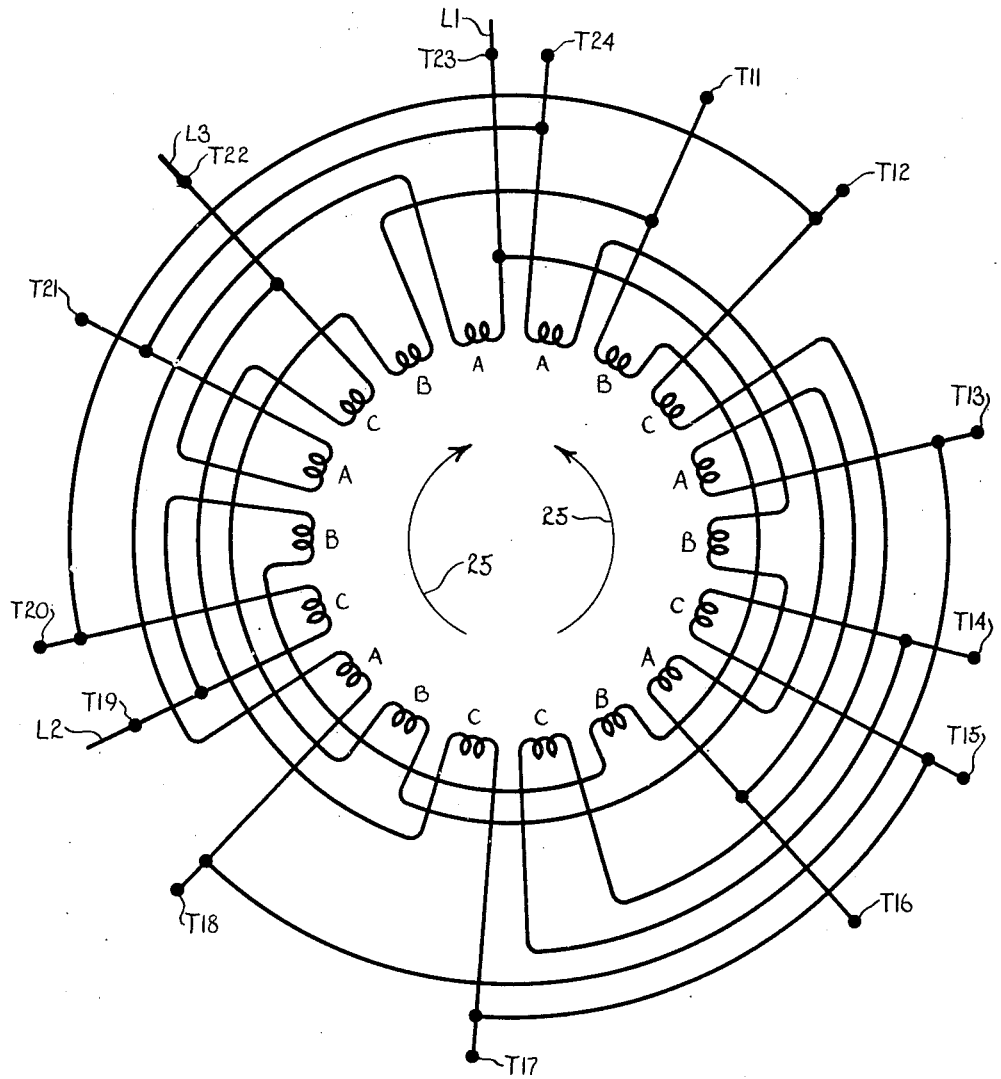

Figure 4 is a diagrammatic developed representation of a portion of a squirrel cage rotor provided with conductor bars skewed in accordance with the principles of this invention; and Figures 5 and 5a are circuit diagrams of still another embodiment of the invention respectively showing the primary connected to be energized from a source of three-phase alternating current to provide a six-pole motor, and reconnected for polyphase energization from the same three-phase current source to provide twelve brake poles.

Figure 1:
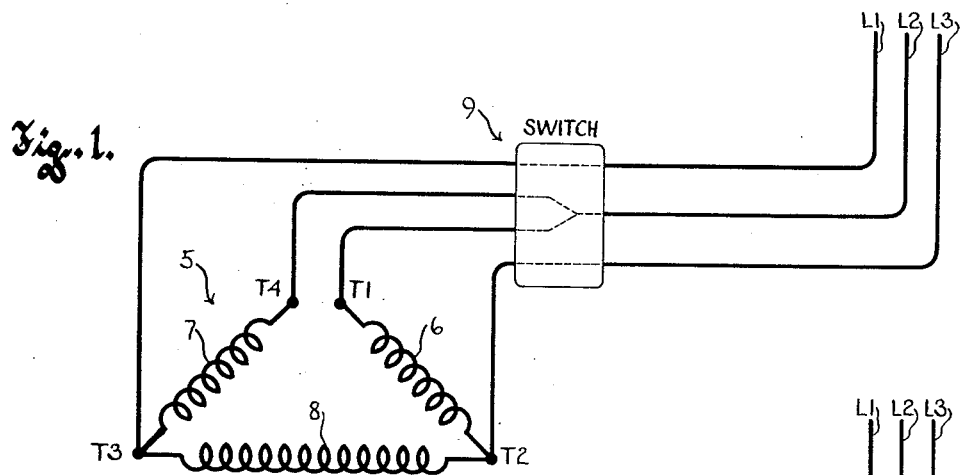
Figures 1 and 1a are circuit diagrams of a polyphase induction motor having a delta-wound primary, and respectively show the manner in which said primary may be connected with an alternating current source for normal motor operation or for braking.
Figure 1A:
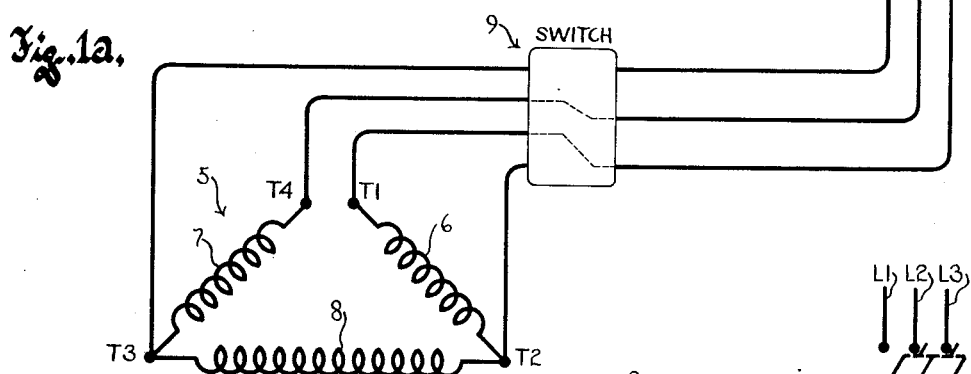
Figure 1B:
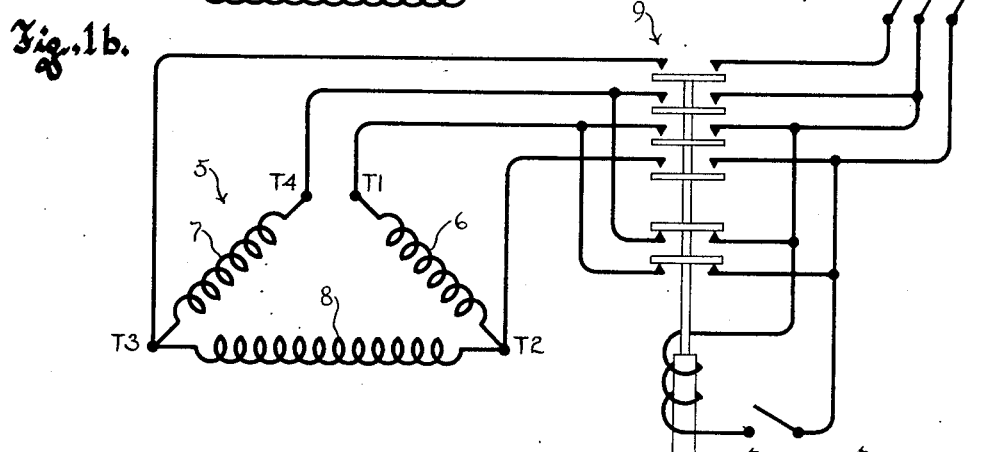

The general principles of the invention are most simply portrayed in Figures 1, 1a and 1b, where the numeral 5 designates the delta-wound primary of a polyphase induction motor. Such a delta-wound primary has three legs 6, 7, 8, which are normally connected in pairs to terminals at the apexes of the delta, each terminal being connectable with one of the lines L1, L2, L3 of a three-phase power supply.

The delta-wound primary of this invention is conventional in this respect, except that the upper ends of two of the legs 6 and 7, instead of being connected directly to a common terminal, are connected to separate terminals T1 and T4. When the stator winding is connected for polyphase motoring operation, these two terminals T1 and T4 are both connected with line L2 through any suitable switch instrumentality, designated generally by 9, it being understood that the switch instrumentality also provides for connection of the remaining terminals T2 and T3 with lines L3 and L1, respectively. With the switch in the position shown in Figure 1 the motor operates as a conventional three-phase induction motor.

With the switch means 9 in the position indicated schematically in Figure 1a, the terminals T1 and T4 are respectively connected with the lines L3 and L2 of the polyphase current source, and the terminals T2 and T3 are disconnected from the mains so that the winding is energized by single-phase alternating current which is serially directed through the legs of the delta. When so reconnected the motor becomes a single-phase induction motor having a number of poles greater than those produced by the primary when energized for motoring operation, and the rotor will be positively decelerated from motoring speed to and below a synchronous speed corresponding to that of a motor of such number of poles.

The primary when so energized by single-phase current becomes a brake winding and produces an alternating field which may be resolved into two fields rotating in opposite directions, one of which is regenerating and the other plugging, and the effect of these two fields upon the rotor is to produce deceleration thereof with a positive braking torque. When the rotor is at rest, the two component fields are of equal magnitude.

Ordinarily a rotor decelerated by a primary energized in the manner of that shown in Figure 1a would continue to motor at a uniform low speed determined by the number of brake poles. While braking to this low synchronous speed may suffice for certain applications (as for example in the case of a siren motor), it is another feature of this invention that the rotor may be caused to decelerate further, with a positive braking torque, to any desired speed, including zero speed. This further deceleration is effected by providing the rotor with resistance which has little or no adverse effect upon the performance of the motor during polyphase motoring, but which provides the rotor with a high effective resistance at the lower speeds which obtain when the rotor has been decelerated to the low synchronous speed determined by the brake winding.

To some extent the necessary effective resistance at this low speed can be obtained by the use in the rotor 10 (see Figure 4) of high resistance conductor bars 11, it being understood that the end rings 12, have negligible influence upon the total resistance of the rotor. However, it is not necessary to provide the rotor with so much resistance as to adversely affect motor performance, since the effective resistance of the rotor at low speed can be very substantially increased by the expedient illustrated in Figure 4, which is a developed view of a portion of the rotor surface. The conductor bars may be skewed a substantial amount, to thus materially decrease the distribution factor and thereby add substantial apparent resistance to the rotor when the brake winding is energized so that the rotor has a high effective resistance at such times. It has been found that skewing the conductor bars through an arc equivalent to 1.15 to 1.65 times the brake pole arc effects an optimum apparent resistance, the braking torque on the rotor, other things being equal, being decreased at values of skew above and below this optimum range.

It will be appreciated that skewing the rotor bars to this extent will have negligible effect, if any, upon performance of the rotor during motoring operation because the arc of the motor poles is substantially greater than that of the brake poles, being, for example, three times that of the brake poles, and consequently the distribution factor due to the skewed rotor bars is substantially greater during motoring operation than during braking operation.

Since the braking torque at speeds below the low synchronous speed determined by the primary when energized as a brake winding is a function of the effective resistance of the rotor, it will be seen that the rate of deceleration of the rotor can be governed by varying its effective resistance either by means of the amount of skew imparted to its conductor bars or by the actual resistance inherent in said bars, or of course by a combination of these factors. Thus in installations where the rotor is required to be stopped rather quickly, the effective resistance of the rotor should be high, while if relatively gradual deceleration is desired, or if it is desired to bring the rotor down to a very low speed at which it may continue to rotate with little torque, the rotor should have a somewhat lower effective resistance.

Obviously if deceleration is desired only to the synchronous speed corresponding to the brake poles, the rotor may be provided with normal effective resistance.

While the primary coil groups connected to provide brake poles should exceed in number the coil groups connected to provide motor poles, there is no invariable rule as to the relationship between numbers of brake and motor poles, but in most cases it will be found desirable to produce a number of brake poles which is an integral multiple of the number of motor poles.

Figure 2:
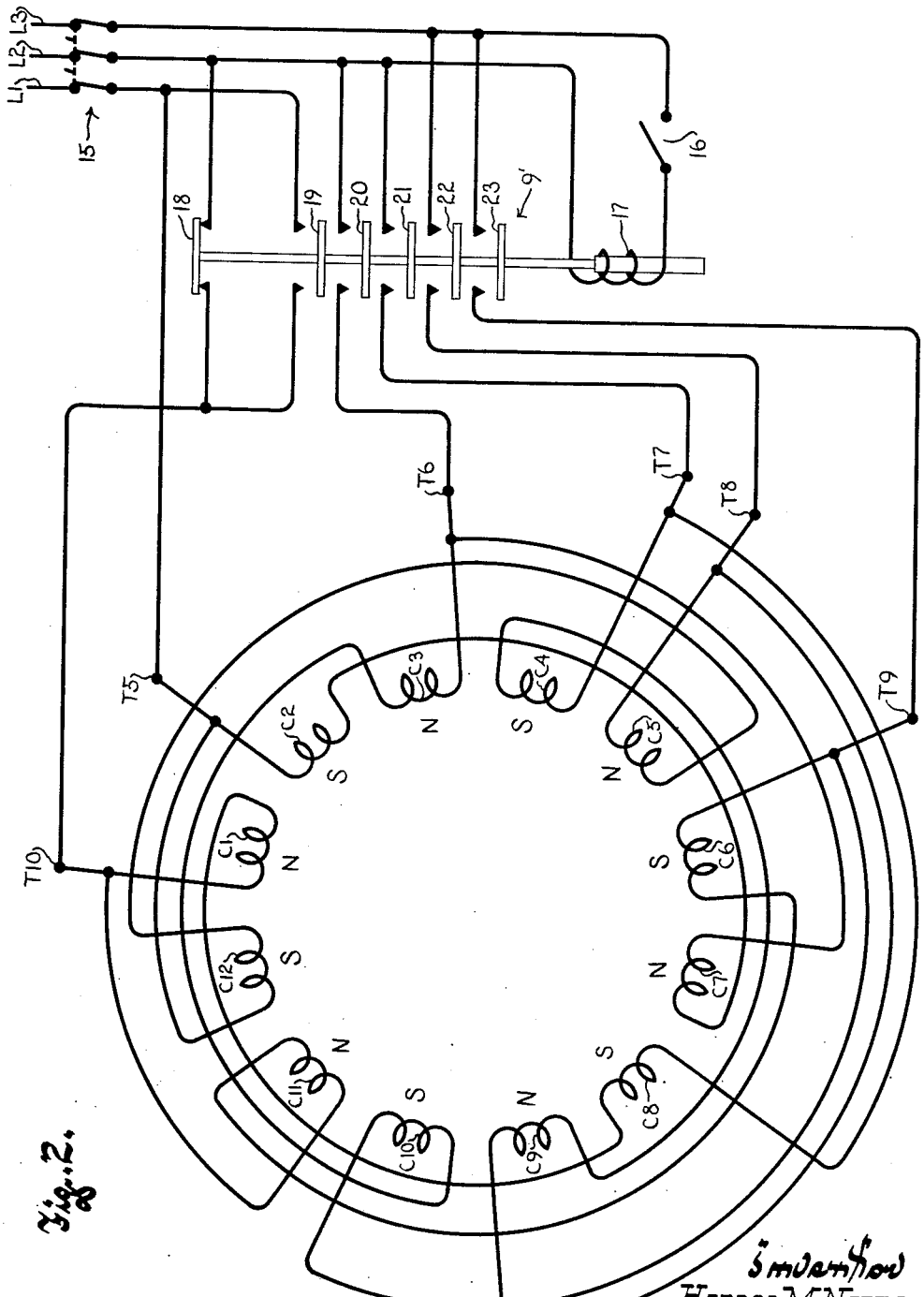
Figure 2 is a circuit diagram of a two-pole polyphase motor having a primary which is reconnectable to be energized by single-phase alternating current to produce twelve brake poles.

Figure 2 shows a three-phase induction motor having a primary which is connectable in parallel delta to provide two motor poles and is reconnectable to provide twelve brake poles. For braking, the several coils comprising the primary are connected in two equal groups with the coils in each group connected in series with one another and with the two groups of coils connected in parallel.

With the line switch 15 in the circuit of Figure 2 closed, the primary may be connected with the three-phase power source L1, L2, L3 through the electromagnetic switch instrumentality designated generally by 9' either for motoring operation powered by three-phase alternating current or for braking operation energized by single-phase current. Assuming the motor to be running at normal motoring speeds, the electromagnetic switch may be caused to open and assume the position shown in Figure 2 to initiate braking of the motor. This is accomplished by opening a manual control switch 16 governing energization of the solenoid 17 of the electromagnetic switch.

With switch 16 open to deenergize electromagnetic switch 9', as seen in the diagram, line L2 is connected with motor terminal T10 through the closed contactor 18 of the electromagnetic switch, and all of the remaining motor terminals are disconnected from the mains, except terminal T5 which is at all times directly connected with line L1. The flow of single-phase current for braking energization of the primary may then be traced serially from the line L1 through all of the groups of coils (identified as C1 to C12, inclusive) comprising each of the parallel connected delta windings, the return being to line L2. Such energization of the coil groups produces a braking field having twelve poles, each pole being provided by one of the coil groups, and adjacent groups of coils producing unlike poles, the polarities of the poles at an arbitrarily selected instant being as indicated by the designations N and S in the figure.

The two-pole polyphase motor thus becomes a single-phase induction motor having six times the number of poles and therefore having a synchronous speed which is one-sixth that of the polyphase motor. With the primary thus energized from a source of single-phase alternating current, it produces the effect of a pair of oppositely rotating fields which act on the rotor to quickly decelerate the same from normal motoring speed to the low synchronous speed determined by the twelve-pole brake winding and which further decelerate the rotor from said low speed at a rate dependent upon the effective resistance of the rotor in the manner discussed hereinabove.

When it is again desired to operate the device as a motor, the switch 16 is closed to effect energization of the solenoid 17 from a pair of the mains L2, L3 and thereby open contactor 18 of the switch instrumentality which governs energization of the brake winding. Simultaneously the remaining contactors 19, 20, 21, 22 and 23 of the switch are closed to thereby convert the primary from a brake winding to a motor winding energized from the three-phase main. Terminals T5 and T10 are now both connected with line L1, the latter terminal through the contactor 19; terminals T6 and T7 are both connected with line L2 through contactors 20 and 21 respectively; and terminals T8 and T9 are connected with line L3 through contactors 22 and 23 respectively. With the primary energized as a motor winding in this manner, the groups of coils are connected with the mains and are paired as follows: connected with the line L1 are the coil groups C2 and C7 and, in parallel with them, the coil groups C1 and C8; connected with the line L2 are the coil groups C3 and C10 and, in parallel with them, the coil groups C4 and C9; connected with the line L3 are the coil groups C5 and C12 and, in parallel with them, the coil groups C6 and C11. It will be seen that this arrangement of the coil groups connects the motor windings in a pair of parallel deltas.

The primary of the Figure 2 motor is thus similar to that of the embodiment of the invention shown in Figures 1–1b, inclusive, except that the Figure 2 primary comprises a pair of deltas connected in parallel, and during braking the coil groups C2, C7, C3, C10, C6 and C11 are connected in series with one another across lines L1 and L2 to provide one of the opened deltas, while coil groups C12, C5, C9, C4, C8 and C1 are connected in series across said lines to provide the other shunted opened delta.

Figure 3:
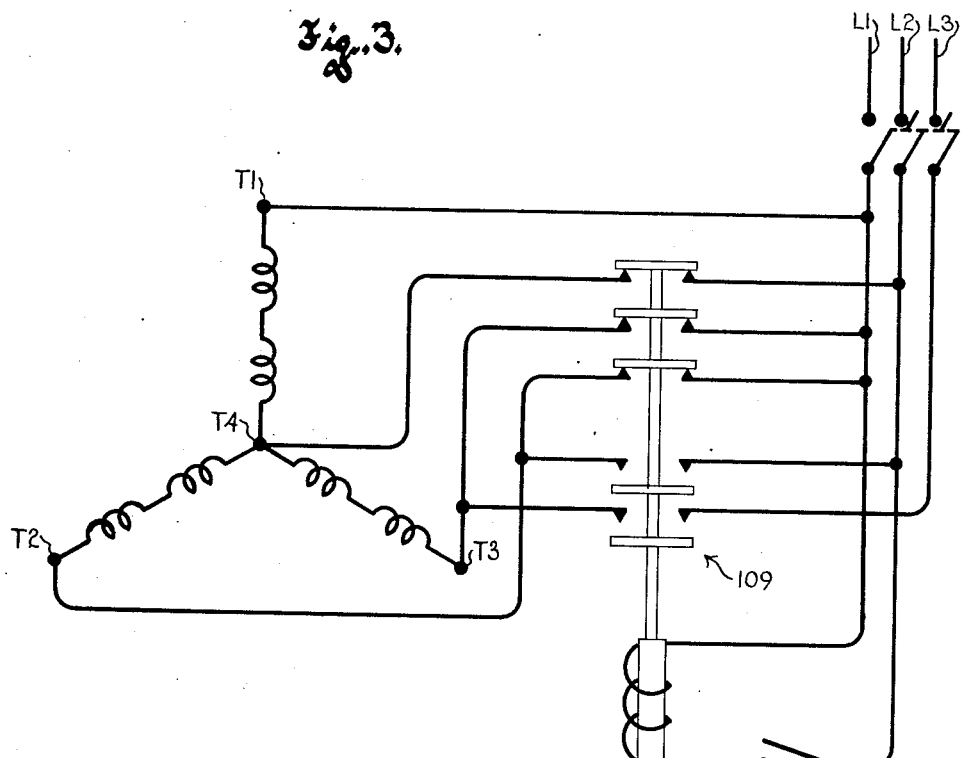
Figure 3 is a circuit diagram similar to Figure 1b but illustrating another embodiment of the invention in a motor having a Y-connected primary.

Employing the principles of this invention, single-phase braking may also be accomplished with motors having a Y-connected primary as illustrated schematically in Figure 3. When operated as a motor with the manual switch 16' closed and electromagnetic switch 109 energized, the connections of the primary to the mains L1, L2 and L3 are conventional, the terminals T2 and T3 being connected with lines L2 and L3 respectively through the two lower contactors of the switch 109 and the terminal T1 being permanently connected with line L1. Opening of manual switch 16' for single-phase braking operation effects connection of all three terminals T1, T2 and T3 with line L1, and of the center terminal T4 of the Y-connected primary with the line L2, in the manner shown in Figure 3.

From the description thus far it will be appreciated that this invention lends itself equally well to delta- and Y-connected primaries. It is also true that the invention is adaptable to both types of primaries whether the same are single connected (as in Figures 1 and 3) or doubled and paralleled (as in Figure 2). While Figure 2 illustrates a double delta-connected primary, a double Y-connected primary may be reconnected and energized by single-phase current for dynamic braking, as for example, by connecting one of the two neutral centers of the Y's to one of the single-phase power supply lines, and the other center to the other single-phase line, the outer ends of the legs of both Y's being disconnected from the lines during braking, all in a manner which will be obvious from Figures 2 and 3.

This invention is not limited in its application to single-phase braking operation. It is also possible to effect reconnection of the primary to energize it as a brake winding with polyphase current from the three-phase mains by which the motor is powered, and in that case the brake winding coils are arranged in groups to produce poles which have the effect of providing a pair of oppositely rotating fields of substantially equal strength. Figure 5 depicts a machine operating as a three-phase motor having six poles and, as shown in Figure 5a, having its primary reconnected to provide twelve brake poles comprising six true poles and six consequent poles. The machine of Figures 5 and 5a also differs from those embodiments previously described in that when operating as a motor the primary is parallel Y-connected, and when reconnected for braking the primary is series delta-connected.

When the groups of coils comprising the primary are connected to provide a motor winding, terminal T11 is connected with line L1, terminal T16 is connected with line L2, and terminal T14 is connected with line L3, and the other terminals are connected as shown to provide six motor poles, each produced by three adjacent groups of coils, each of which groups is energized by current of a different phase. The current phases in the several coil groups are designated by the letters A, B and C in Figure 5, which respectively correspond to the current phases in lines L1, L2 and L3. The connections between certain of the coil groups are made through terminals designated T11 through T24, certain of which terminals are connected with one another in one arrangement for motoring and in another arrangement for braking.

With the terminals T23, T19 and T22 connected with lines L1, L2 and L3 respectively and with the other terminals connected as shown in Figure 5a, the primary is converted to a brake winding and the current phase relationship in the coil groups of the primary is then as designated by the letters A, B and C, which have the same significance as in Figure 5.

It will be observed that the relative direction of current flow in the coil groups energized by current of each phase during braking is such as to create consequent poles, and it will further be observed that the brake poles in one-half of the primary are arranged as a mirror image of those in the other half to thus produce the effect of a pair of oppositely rotating substantially equal fields, as indicated by arrows 25, by which deceleration of the rotor is effected. Obviously if complete deceleration of the rotor to zero speed is not desired when the brake winding is energized, the coils which define one of the two mirror image pole groups may be provided with greater resistance than those defining the other pole group so as to create oppositely rotating fields of unequal force, the minimum speed to which the rotor is braked then being a function of the difference in currents through the coils forming each mirror image group.

The requirements for effective rotor resistance which obtain in the case of brake operation with single-phase currents are likewise applicable to braking with polyphase currents, and it will be understood that if positive deceleration to zero speed is not required the rotor may have a correspondingly lower effective resistance.

Those skilled in the art will readily appreciate that the employment of reconnectable windings which may be converted from motoring to braking operation necessitates some attention to the selection of coil pitch for the primary. It may be stated as a general rule to assist in the design of dynamically braked motors embodying the principles of this invention that the pitch of the stator coils should in every instance be other than an even multiple of the brake pole pitch although it need not necessarily be an integral multiple thereof.

It will be obvious to those skilled in the art that the principles of this invention, while generally finding their most useful embodiments in machines having reconnectable primaries, are nevertheless equally applicable to motors having separate windings for motoring and braking. In some instances, in fact, it may be desirable to employ a separate brake winding, particularly in cases such as that illustrated in Figures 5 and 5a where the numerous reconnections which would have to be made in a convertible primary would entail bringing a large number of external leads out of the primary and the employment of a switch instrumentality having an unusually large number of terminals. The choice of reconnectable or separate windings, other considerations being equal, may in most cases be determined by the relative first cost and maintenance cost of a switch having the necessary large number of contacts as compared with the additional cost of providing a separate brake winding on the stator.

From the foregoing description, taken together with the accompanying drawings, it will be apparent that this invention makes possible dynamic braking of a polyphase induction motor of the type having a squirrel cage rotor, through the expedient of providing a brake winding which may be energized by alternating current in such a way as to produce a number of brake poles in excess of the number of motor poles and giving the effect of a pair of oppositely rotating fields of substantially equal strength, which fields exert a positive braking force on the rotor and effect deceleration thereof to any desired low speed, including zero speed, depending upon the effective resistance of the rotor.

What I claim as my invention is:

1. In a dynamically braked polyphase motor having a squirrel cage rotor and a stator: means on the stator defining a motor winding which, when energized with alternating current, produces a number of motor poles and a single field which rotates in one direction; means on the stator defining a brake winding which, when energized with alternating current, produces a larger number of poles and the effect of a pair of fields which rotate in opposite directions and are of substantially equal strength when the rotor is at rest, and which last named fields effect positive deceleration of the rotor toward a low speed from normal motoring speed; means for independently, non-concurrently connecting each of said windings with an alternating current source to effect such energization of the windings; and means comprising conductor bars on the rotor skewed through an arc not greater than twice the pitch of the brake poles, thus providing the rotor with sufficiently high effective resistance to render the rotor inoperative for motoring when the oppositely rotating fields produced by the brake winding obtain, without creating an undesirably high effective rotor resistance during motoring, whereby the rotor is positively decelerated from said low speed.

2. In a dynamically braked polyphase motor having a squirrel cage rotor and a stator with coils wound thereon: means for connecting coils on the stator in groups defining a motor winding which may be energized by a polyphase alternating current to produce a number of motor poles and a field which rotates in one direction; means for connecting said coils on the stator in other groups defining a brake winding, and for non-concurrently energizing said brake winding with the same polyphase current by which the motor winding is energized, to produce a number of brake poles at least twice said number of motor poles and giving the effect of a pair of fields that rotate in opposite directions and are of substantially equal strength when the rotor is at rest, and which oppositely rotating fields effect deceleration of the rotor toward a low speed from normal motoring speed; and means on the rotor providing the same with sufficiently high effective resistance to render the rotor inoperative for motoring when said oppositely rotating fields produced by the brake winding obtain, said means comprising conductor bars on the rotor skewed through an arc not greater than twice the pitch of the brake poles, whereby said high effective resistance of the rotor is manifested only during energization of the brake winding to assure positive deceleration of the rotor from said low speed, and the effective resistance of the rotor is not objectionably high during motoring.

References Cited in the file of this patent

UNITED STATES PATENTS

| | | |
|---|---|---|
| 1,915,778 | Dreese | June 27, 1933 |
| 2,510,468 | Fuge | June 6, 1950 |
| 2,627,059 | Noodleman | Jan. 27, 1953 |

FOREIGN PATENTS

| | | |
|---|---|---|
| 434,451 | Great Britain | Sept. 2, 1935 |
| 487,695 | Great Britain | June 24, 1938 |